No. 806,494. PATENTED DEC. 5, 1905.
J. M. PYOTT, Jr.
REEL FOR FISHING RODS.
APPLICATION FILED AUG. 7, 1905.
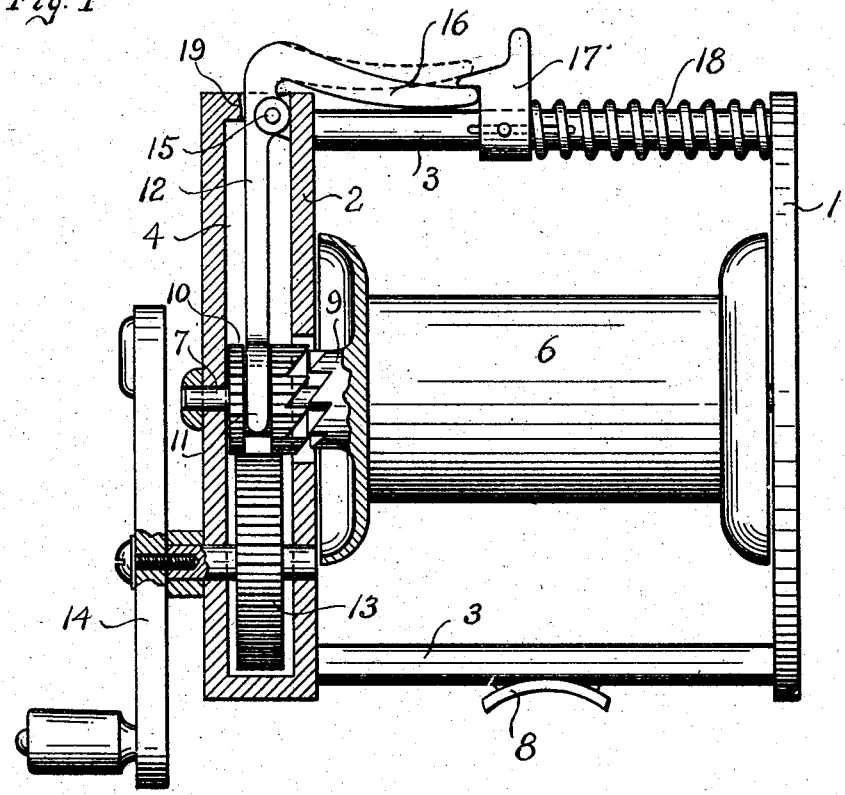
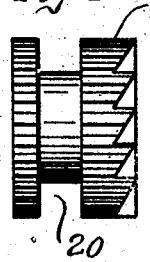
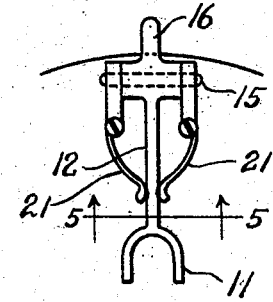
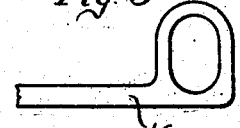
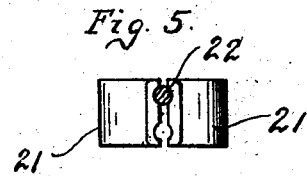
WITNESSES:
O. E. Johnson
INVENTOR.
James M. Pyott, Jr.,
BY Rummler & Rummler
ATTORNEYS.

UNITED STATES PATENT OFFICE.

JAMES M. PYOTT, JR., OF CHICAGO, ILLINOIS.

REEL FOR FISHING-RODS.

No. 806,494.    Specification of Letters Patent.    Patented Dec. 5, 1905.

Application filed August 7, 1905. Serial No. 273,095.

*To all whom it may concern:*

Be it known that I, JAMES M. PYOTT, Jr., a citizen of the United States of America, and a resident of Chicago, in the county of Cook and State of Illinois, have invented certain new and useful Improvements in Reels for Fishing-Rods, of which the following is a specification.

This invention relates to reels for fishing-rods; and its main objects are to provide an improved and inexpensive form of clutch mechanism for throwing the drum of the reel into and out of mesh with the operating-gear thereof, to provide an improved arrangement of parts whereby the lever for operating said clutch will be disposed in convenient position to be shifted by the thumb of the operator while holding the rod in the same hand, and to provide an improved form of spring-detent for locking said lever in each of its limiting positions. I accomplish these objects by the device shown in the accompanying drawings, in which—

Figure 1 is an elevation, partly in section, of a fishing-rod reel constructed according to my invention. Fig. 2 is an enlarged detail showing the construction of the pinion which forms part of the controlling-clutch. Fig. 3 is a fragmentary plan of the end of the operating-lever as viewed from the top of Fig. 1. Fig. 4 is a modified form of spring-detent for securing the lever in its limiting positions. Fig. 5 is an end view of the same as seen from the bottom of Fig. 4, the lever being cut on the line 5 5.

In the form shown in the drawings the frame of the reel consists of end plates 1 and 2, rigidly connected by means of a plurality of braces 3. The end plate 2 forms part of a housing 4 for inclosing the operating mechanism. The drum 6 of the reel is rigidly mounted on a shaft 7, which is journaled within the frame, the braces 3 being disposed longitudinally of the drum and spaced equally distant therefrom. The reel is provided with the usual curved plate 8, disposed transversely of the drum and adapted for securing the same to the fishing-rod.

A clutch member 9 is rigid on the shaft 7 at the end of the drum, which is adjacent to the housing. This clutch member is provided with teeth which mesh with corresponding clutch-teeth on the pinion 10. This pinion is loosely mounted on the shaft 7 and longitudinally slidable thereon into and out of engagement with the clutch member 9. The periphery of the pinion is grooved to receive the forked end 11 of the lever 12, which controls the position of the pinion. The teeth of the pinion mesh with those of a gear 13, which is journaled in the housing 4 at one side of the shaft 7 and is adapted to be rotated by the usual counterbalanced handle 14.

The lever 12 is pivoted to the plate 2 at 15 and has an arm 16 extending along the outside of one of the braces 3 to a position midway between the plates 1 and 2 and on the side of the reel which is opposite the fastening-plate 8. The arm 16 is thus in convenient position to be raised or lowered by the thumb of the same hand in which the rod is being held and without removing the thumb from a position where it may be pressed down against the drum for controlling the speed with which the line is unwound when being carried out by a fish.

A detent 17 is slidably mounted upon the brace 3, which is adjacent to the arm 16 and is suitably formed to engage the arm 16 and secure it in either of its limiting positions. The detent is normally urged into position for engaging the arm 16 by the spring 18, which is coiled around the brace 3. In the form shown in the drawings the detent 17 is prevented from rotating on the brace 3 by being splined thereto. The aperture in the side of the housing through which the arm 16 extends is limited in size, so as to form a stop at 19 for preventing the clutch members from being forced too tightly together, and thus causing friction between the fork 11 and the sides of the groove 20 in the pinion. The pinion is preferably of such width as to mesh with the gear 13 at all times.

In the modification shown in Fig. 4 the detent 17 and the springs 18 are replaced by a pair of specially-formed springs 21, which bear toward each other from opposite sides of the lever 12 and which are provided with recesses 22 corresponding to the two limiting positions of the lever.

The operation of the device shown is as follows: The operator grasps the fishing-rod in one hand, with his thumb resting against the drum 6, near the lever-arm 16. When the parts are in the position shown in Fig. 1, the pinion 10 is disconnected from the drum, so that the drum is free to rotate without carrying with it the driving-gearing. When the operator desires to throw the gearing into the operative position, he moves his thumb to push the detent 17 toward the right of Fig. 1 and at the same time lift the lever 16 to the position shown by dotted lines. This throws the gearings into operative position. The detent 17 is then released and springs into engagement with the lever and secures the parts in this position until again shifted by the operator's thumb.

I claim—

1. In a reel for fishing-rods, the combination of a frame comprising a pair of end plates spaced apart and rigidly connected by a plurality of braces, a drum loosely journaled between said end plates and having at one end a clutch member, a pinion loosely journaled in axial alinement with said drum and having a clutch-face, said pinion being slidable into and out of engagement with said clutch member, mechanism for rotating said pinion, a lever pivotally mounted on one of said end plates and being connected with said pinion for shifting the same, said lever having an arm disposed longitudinally of the drum and extending along one side of said drum toward its middle part, and a spring-detent adapted to secure said lever in either of the positions for holding said pinion into or out of engagement with said clutch member.

2. In a reel for fishing-rods, the combination of a frame comprising a pair of end plates spaced apart and rigidly connected by a plurality of braces, a drum loosely journaled between said end plates and having at one end a clutch member, a pinion loosely journaled in axial alinement with said arm and having a clutch-face, said pinion being slidable into and out of engagement with said clutch member, mechanism for rotating said pinion, a lever pivotally mounted on one of said end plates and connected with said pinion for shifting the same, said lever having an arm disposed longitudinally of the drum and extending along one side of said drum toward its middle part, a detent slidably mounted on one of said braces and adapted to secure said lever against shifting when in either of the positions for holding said pinion into or out of engagement with said clutch member, and a coiled spring surrounding said brace and normally urging said detent into engagement with said lever.

3. In a reel for fishing-rods, the combination of a frame, a drum journaled in said frame, fastening means at one side of the drum for securing said frame to a rod, a system of gearing for rotating said drum, a clutch controlling the connection between said gearing and drum, a lever having a limited pivotal movement on said frame and adapted to operate said clutch, said lever having an arm disposed longitudinally of the drum on the side opposite said fastening means, and a spring-detent for securing said lever in each of its limiting positions.

Signed at Chicago this 4th day of August, 1905.

JAMES M. PYOTT, Jr.

Witnesses:
RUDOW RUMMLER,
EUGENE A. RUMMLER.